(12) United States Patent
Oestreich

(10) Patent No.: US 7,020,483 B2
(45) Date of Patent: Mar. 28, 2006

(54) POWER CONTROL IN MOBILE RADIO TELEPHONE SYSTEMS WHEN TRANSMISSION IS INTERRUPTED

(75) Inventor: Stefan Oestreich, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 384 days.

(21) Appl. No.: 10/181,137

(22) PCT Filed: Jan. 12, 2001

(86) PCT No.: PCT/DE01/00109

§ 371 (c)(1),
(2), (4) Date: Jul. 12, 2002

(87) PCT Pub. No.: WO01/52440

PCT Pub. Date: Jul. 19, 2001

(65) Prior Publication Data

US 2003/0003875 A1    Jan. 2, 2003

(30) Foreign Application Priority Data

Jan. 14, 2000  (DE) ............................... 100 01 367

(51) Int. Cl.
*H04B 7/00*    (2006.01)
(52) U.S. Cl. .................... 455/522; 455/69; 370/318
(58) Field of Classification Search ............... 455/522, 455/69, 436, 442, 63.1, 452.2, 574; 370/318, 370/320, 332, 333, 335, 342
See application file for complete search history.

(56) References Cited

U.S. PATENT DOCUMENTS

| 5,528,593 A | 6/1996 | English et al. |
| 5,742,595 A | 4/1998 | Bhagalia |
| 5,790,940 A | 8/1998 | Laborde et al. |
| 5,946,346 A * | 8/1999 | Ahmed et al. ............... 375/219 |
| 6,144,861 A * | 11/2000 | Sundelin et al. ............ 455/522 |
| 6,351,458 B1 * | 2/2002 | Miya et al. ................ 370/330 |
| 6,621,809 B1 * | 9/2003 | Lee et al. .................... 370/335 |

FOREIGN PATENT DOCUMENTS

| EP | 0 940 933 A2 | 9/1999 |
| EP | 0 949 830 A2 | 10/1999 |
| WO | WO 98/23044 | 5/1998 |
| WO | WO 98/45962 | 10/1998 |

OTHER PUBLICATIONS

ARIB IMT-2000 Study Committee: Japan's Proposal for Candidate Radio Transmission Technology on IMT-2000, Jun. 1998.

* cited by examiner

*Primary Examiner*—Nay Maung
*Assistant Examiner*—Raymond Dean
(74) *Attorney, Agent, or Firm*—Bell, Boyd & Lloyd LLC

(57) ABSTRACT

A method is provided for transmission power control and a radio communications system having at least one first and one second station which communicate with each other, wherein a receiving one of the stations determines the reception power of a signal which is sent from the other station, and the transmitting station transmits a power control instruction, with the receiving station using a signal which is independent of communication data in order to determine the power control instruction.

12 Claims, 3 Drawing Sheets

POWER CONTROL IN MOBILE RADIO TELEPHONE SYSTEMS WHEN TRANSMISSION IS INTERRUPTED

BACKGROUND OF THE INVENTION

In radio communications systems, such as the second generation European Mobile Radio System GSM (Global System for Mobile Communications), information such as speech, picture information or other data is transmitted on electromagnetic waves via a radio interface. The radio interface relates to a connection between a base station and a large number of subscriber stations, in which case the subscriber stations may, for example, be mobile stations or fixed-position radio stations. The electromagnetic waves are, in this case, transmitted at carrier frequencies which are in a frequency band provided for the respective system. Frequencies in the frequency band around 2000 MHz have been provided for future radio communications systems, such as the UMTS (Universal Mobile Telecommunications system), or other $3^{rd}$ generation systems. Two modes are envisaged for the third mobile radio generation UMTS, with one mode being referred to as FDD operation (Frequency Division Duplex), and the other mode being referred to as TDD operation (Time Division Duplex). These modes are used in different frequency bands, with both modes supporting a so-called CDMA subscriber separation method (Code Division Multiple Access).

In mobile radio systems which use subscriber separation based on a CDMA method, rapid power control is necessary in order to ensure reliable reception of all existing communication links at the location of the base station, with few disturbances due to interference from adjacent transmission channels occurring at the same time. The rapid transmission power control is required, in particular, for real time services such as speech transmission at low speeds. Rapid transmission power control based on a closed control loop and an open control loop is implemented for the FDD mode according to the prior art; for example, as in the document ARIB "Japan's Proposal for Candidate Radio Transmission Technology on IMT-2000: W-CDMA", Jun. 1998, Japan, pages 39 to 42. The use of the open or closed control loop is, in this case, dependent on the respective type of transmission channel. The rapid closed control loop is based on so-called TPC bits (Transmitter Power Control), which are signaled periodically from the respective controlling device in the radio communications system to the other device. A base station thus controls the transmission power of the subscriber station, and vice versa.

A transmission power principle such as this is also, in principle, intended to be used for the TDD mode for harmonization between the two modes in the UMTS mobile radio system.

In order to keep the interference in the TDD mode low, and to stabilize out fading effects in the reception power level, an open power control loop is used in the uplink direction UL and a closed power control loop is used in the downlink direction DL, with these generally being referred to as power control. This results in the inner and outer control loops in the downlink direction. The outer loop measures the quality of the input signal (for example, frame error rate) and then presets a nominal value (SIR target) for the signal/interference ratio (SIR), using which the required quality can be provided. The inner loop measures the actual signal/interference ratio of the received signal, and compares this with the nominal value for the signal/interference ratio. Depending on the result, a power control command is transmitted to the opposite end, to change the transmission power level appropriately. The inner loop thus operates on a frame basis and very quickly, while the outer loop varies the nominal value only slowly. However, this type of power control is dependent on both transmission and reception taking place permanently. The following text considers, in particular, the power control process in the closed loop.

In many situations, such as when there is no data to be transmitted, such as in the case of discontinuous transmission (DTX) of radio frames, the transmission between one terminal, such as a mobile station, and a base station is, however, interrupted, at least in one direction. It is then either impossible to transmit a power control command, and/or no signal is available for reception measurements. The latter situation is important at the time at which the transmission is intended to be resumed, in which case, however, the transmission power level is then undefined, as a result of a lengthy interruption. Furthermore, in this situation without an input signal, both the inner power control loop and the outer power control loop are interrupted. The described problem occurs mainly in TDD systems, such as in UTRA-TDD, when the transmission there is interrupted at times in the event of discontinuous transmission, and the power control loop is hence also interrupted. In the case of CDMA systems using an FDD operating mode, this is generally not critical, since at least control information is still transmitted during an interruption in the data.

In the case of present-day systems, the transmission power has a safety supplement added to it after an interruption; that is to say, transmission takes place at an increased intensity. However, this produces unnecessary interference.

The present invention is, therefore, directed toward a method which allows improved transmission power control during interrupted data transmission in a radio communications system.

SUMMARY OF THE INVENTION

Thus, according to the present invention, an "external" signal is advantageously used in order to maintain the inner power control loop and the outer power control loop when there is no data signal. Power control commands are preferably transmitted unchanged to the transmitter in this case. Due to the lack of data or data signals to be transmitted, the transmitter knows that it must first of all accumulate the commands, and must then correct the transmission power by the accumulated value at a later stage.

In principle, the commands can be added up in the transmitter and in the receiver. If they are added up in the transmitter, the sum can be transmitted to the receiver at regular or irregular time intervals. The operation of the method is thus also possible, in particular, when the regular transmission of power control commands is impossible.

If there is no power control command data input either, the already transmitted values are advantageously kept constant in the receiver.

Alternatively or in addition to this, it is also possible to form sums of the power control commands automatically in the receiver and/or in the transmitter, with the sum being transmitted with a time delay during transmission pauses in the uplink direction.

The sum is advantageously corrected using an "uncertainty factor" which is obtained, for example, from the number of power control commands which it has not been possible to decode.

Additional features and advantages of the present invention are described in, and will be apparent from, the following Detailed Description of the Invention and the Figures.

DETAILED DESCRIPTION OF THE INVENTION

Figure 1:
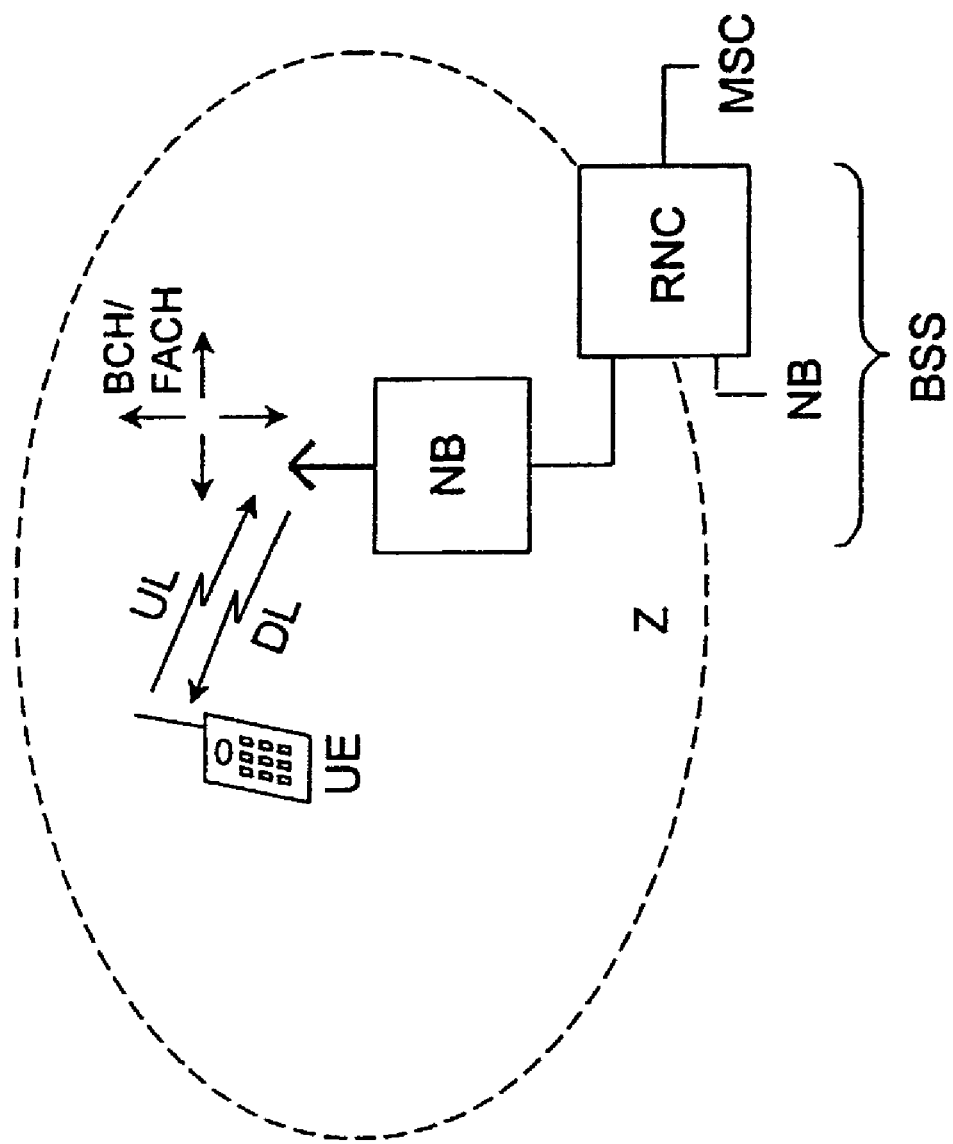
FIG. 1 shows a block diagram of a radio communications system; in particular, of a mobile radio system.

FIG. 1 shows a part of a mobile radio system as an example of the structure of a radio communications system. A mobile radio system in each case includes a large number of mobile switching centers MSC, which are part of a switching network (SSS—Switching Subsystem) and are networked with one another, and/or produce access to a landline network, as well as one or more base station systems BSS (BSS—Base Station Subsystem), which are connected to the mobile switching centers MSC. A base station system BSS also has at least one device RNC (RNC—Radio Network Controller) for assigning radio resources, as well as at least one base station NB (NB—Node B) respectively connected thereto. A base station NB can set up connections via a radio interface to communication terminals or subscriber stations UE (UE—User Equipment), such as mobile stations or other types of mobile and stationary terminals. At least one radio cell Z is formed by each base station NB. The size of the radio cell Z is generally governed by the range of a general signaling channel (BCH—Broadcast Control Channel), which is transmitted by the base stations NB1, NB2 at a respectively defined and constant transmission power level. In the case of sectorization or hierarchical cell structures, each base station NB may also supply a number of radio cells Z. The functionality of this structure can be transferred to other radio communications systems in which the development described in the following text can be used.

The example in FIG. 1 shows a subscriber station UE which is in the form of a mobile station and is moving, for example, at a velocity V in the radio cell Z of the base station NB. The subscriber station UE has set up a connection to the base station NB, on which signals for a selected service are being transmitted in the uplink direction UL and in the downlink direction EL. During the connection, the subscriber station UE periodically evaluates the transmission characteristics of the radio interface to the base station NB supplying it as well as to other base stations NB surrounding the subscriber station UE in order that, if the transmission quality deteriorates, it can request an increase in the transmission power level from the base station NB or, for example, can request that its connection be switched to an adjacent base station NB. An equivalent situation applies if the transmission quality improves, in which case the possibility to reduce the transmission power level is signaled in order to minimize the interference in the radio cell Z.

The subscriber station UE controls the transmission power level of the base station NB via signaling messages (TPC commands), in which, by way of example, it maps a measured variation of the transmission characteristics into a required transmission power change. The transmission characteristics are characterized by a value SIR and BER or its mean value BERavg averaged over a time interval. The periodicity of the outer control loop "Outer Loop" may be chosen, by way of example, as the time interval for the averaging process. Quality assessments such as the bit error rate or the frame error rate may be used, by way of example, as the characteristic value BER. Radio measurement variables such as the path loss, an interference situation at the location of the subscriber station UE as well as combinations of these parameters are preferably used for SIR. The variation of the characteristic values BER and SIR also may be determined additionally or alternatively on the basis of the general signaling channel, broadcast channel BCH, which is transmitted at a constant transmission power level that is known by the subscriber station. The base station NB carries out an identical procedure for controlling the transmission power level of the subscriber station UE. After appropriate evaluation of the transmission characteristics, it signals to the subscriber station UE any increase or decrease in the transmission power level. This signaling takes place, according to the prior art mentioned in the introduction for the FDD mode of the ARIB, via a specific TPC bit (Transmitter Power Control), for example.

Figure 2:
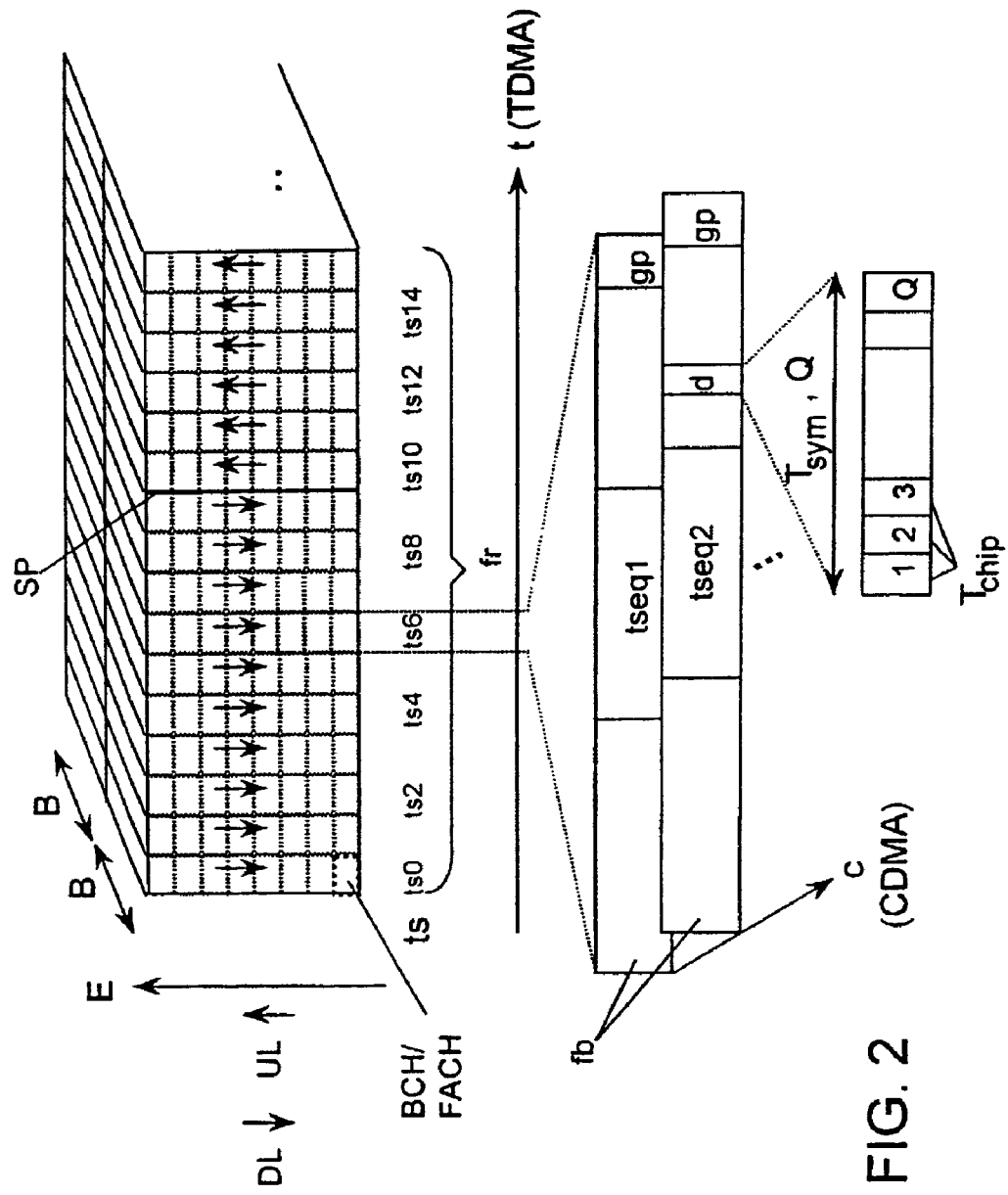
FIG. 2 shows a schematic illustration of the structure of a TDD radio interface.

The frame structure for radio transmission in the TDD mode of the UMTS mobile radio system, in which the proposed method advantageously can be used, is shown in FIG. 2. A broad frequency band is subdivided on the basis of a TDMA component (Time Division Multiple Access) into a number of time slots ts with the same time duration; for example, 16 time slots ts0 to ts15, which form a time frame fr. A frequency band B extends over a specific range of frequencies. Some of the time slots are used for signal transmission in the downlink direction DL, and some of the time slots are used for signal transmission in the uplink direction UL. An asymmetry ratio of 3:2 in favor of the downlink direction DL is illustrated, by way of example. With this TDD transmission method, the frequency band B for the uplink direction UL corresponds to the frequency band B for the downlink direction DL. The same situation is repeated for further carrier frequencies. The variable assignment of the time slots ts for the uplink or downlink directions UL, DL allows a wide range of asymmetric resource assignments to be used.

Information from a number of connections is transmitted in radio blocks within the time slots ts. The data d is spread on a connection-specific basis with a fine structure, a spread code c, so that it is possible to separate, by way of example, n connections via this CDMA component (Code Division Multiple Access) at the receiving end. The spreading of individual symbols of data d results in Q chips of duration $T_{chip}$ being transmitted within the symbol duration $T_{sym}$. The Q chips in this case form the connection-specific spread code c.

As also will be explained in the following text with reference to FIG. 3, the outer control loop Outer Loop is used in a method and a circuit not only for controlling the transmission power level of the base station NB but also for controlling the transmission power level of the subscriber station UE. A target value of a signal/interference ratio Target is determined and is, in each case, signaled in the outer control loop Outer Loop of the base station NB and of the subscriber station UE. The target value for the signal/interference ratio Target SIR ensures an adequate transmission quality, and must be matched as appropriate to the current transmission conditions. The respective inner control loop may, in this case, carry out particularly rapid transmission power control. This rapid transmission power control is carried out via the TPC bit which, in each case, results in an increase or decrease in the transmission power level by a specific value in dB.

Figure 3:
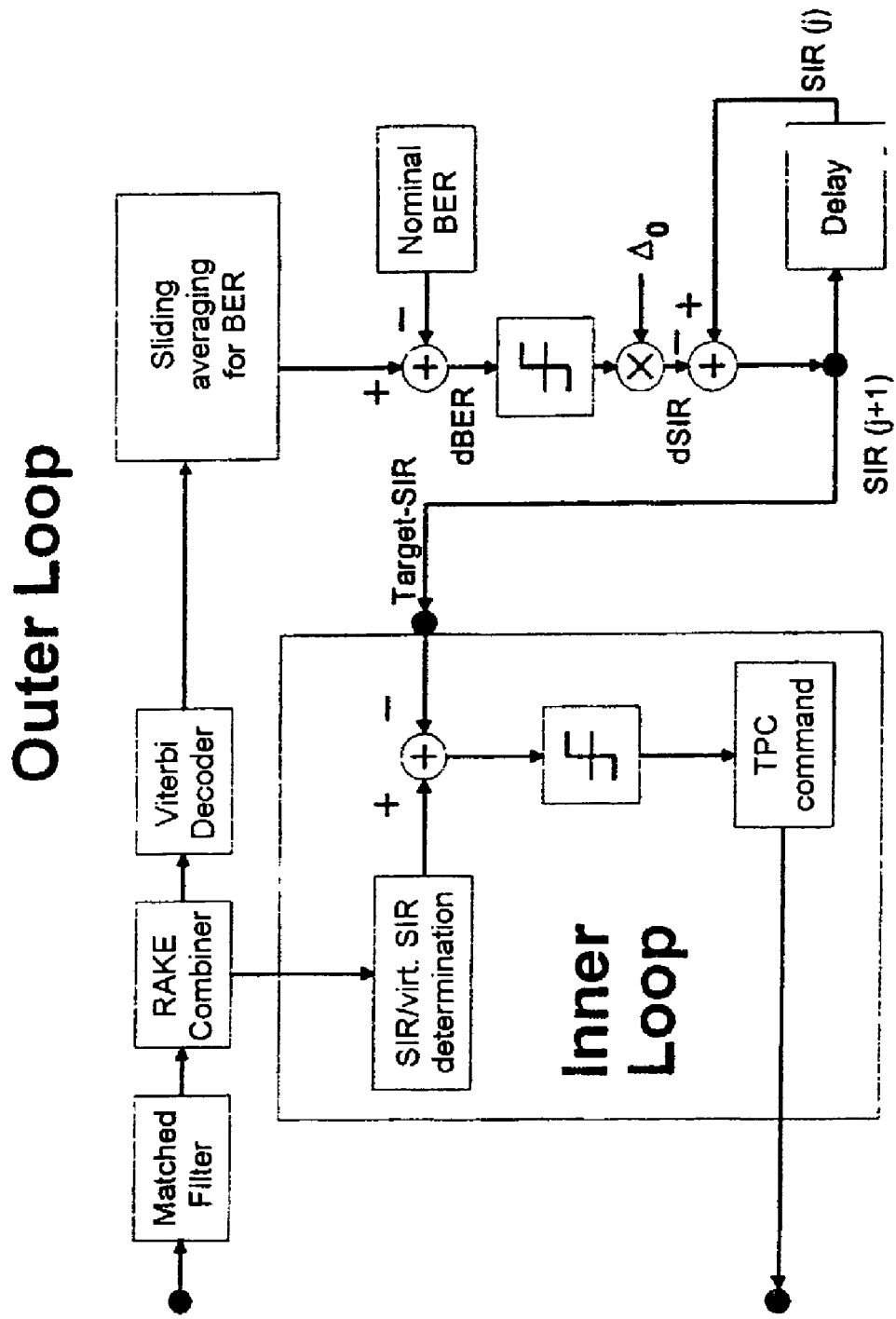
FIG. 3 shows a block diagram of an exemplary implementation of the inner and outer control loop in a transmitting/receiving device for a base station or subscriber station.

By way of example, FIG. 3 shows one implementation of the combination according to the present invention of an inner control loop Inner Loop and an outer control loop Outer Loop in a transmitting/receiver device for the base station NB or else for the subscriber station UE. The structure corresponds to the structure in FIG. 3. 5—5, page 40 of the known prior art from the ARIB. The received signals are filtered in a so-called matched filter, and are supplied to a detector device. In the illustrated example, the detector device is in the form of a known RAKE combiner.

A signal-interference ratio SIR is determined in the inner control loop Inner Loop from the detected signals. The signal/interference ratio SIR is used for rapid transmission power control as the basis for optimum transmission power adjustment, since the interference situation at the receiver represents the most important criterion for reliable reception of the signals.

The received signals are decoded in an outer control loop in a decoding device, such as a Viterbi decoder, connected downstream from the detector device. A characteristic quality value BER is then, in each case, determined. An average of the characteristic value BER is formed in the present circuit. This characteristic value BER is then compared in the outer control loop Outer Loop with a target value for the characteristic quality value Target BER, and the difference dBER between the two values is calculated. The difference dBER is then converted, such as via a weighting factor and other possibly non-linear operations, to a correction value dSIR for the signal/interference ratio. An addition process is then carried out with a target value for the signal/interference ratio SIR(j) from a preceding control interval j. The current target value resulting from this for the signal/interference ratio SIR(j+1) or for the Target SIR is delayed in the same manner via a delay device DELAY by, in this case, one j-step, and is then taken into account for the calculation of the subsequent target value. The current nominal value Target SIR is used for rapid transmissions power control in the inner control loop Inner Loop as the basis for increasing or reducing the transmission power level by the signaling of a TPC bit.

In order to improve the transmission power control during interrupted data transmission, the following text describes a method and an upgraded circuit, in which another channel with known characteristics is used for measurements and, furthermore, power control commands are still transmitted.

Interrupted data transmissions occur, by way of example, with UTRA-TDD, when discontinuous data transmission (DTX) is used for a downlink transmission; that is to say, in the so-called downlink. During the interruptions, the subscriber station UE can no longer carry out any measurements on the data channel. In fact, there is always a common control channel in the downlink connection, for example, the signaling or broadcast channel BCH, which can be received by every subscriber station UE and which is neither directional nor subject to power control.

The subscriber station UE regularly measures the reception power level ELBC and the quality QBC of the broadcast channel BCH and, in addition, the disturbance power level of the data. As a rule, it can be assumed that this reception power level ELBC on the broadcast channel BCH, in particular, fluctuates relative to the reception quality of data which is received on a data channel. Known algorithms, thus, can still be used for controlling the inner loop for power control of the transmission pauses, since the supply can be maintained using measurement values from another measurement.

During pauses in the data transmission in the downlink direction, the subscriber station UE uses in its inner loop the i-th virtual signal/interference ratio value:

$$SIR_{virt}(i) = RSCP_{virt}(i) - ISCP(i).$$

The index i starts from 1 for the data transmission frames during an interruption or transmission pause.

$RSCP_{virt}(i)$ represents the virtual received signal power level, and $ISCP(i)$ represents the interference signal power level in the associated data channel. In this case, furthermore $$RSCP_{virt}(i) = RSCP(0) + L(0) - L(i) + \Sigma TPC(k).$$

$L(0)$ represents the last path loss value before the transmission pause, and $L(i)$ represents the current path loss. The path loss is obtained from the difference between the known transmission power level of the broadcast channel BCH and its measured reception power level. All the parameters in the above formulae are logarithmic; that is, they can be regarded as being in dB or dBm. The value $RSCP_{virt}(i)$ thus takes into account the most recent actually measured RSCP value before the interruption, the path loss $L(i)$ in dB which was measured on the broadcast channel BCH, the path loss $L(0)$ determined most recently before the interruption, and the sum of the power control commands $TPC(k)$ in dB over i-1 frames during the interruption. In the case of a TPC bit with only two logic states 0 and 1, it is possible, by way of example, to use the TPC bit "1" for an increase and the TPC bit "0" for a decrease by one step of magnitude x dB, that is to say TPC=+x or -x, respectively.

During interruptions, the TPC commands are calculated via these virtual signal/interference ratio measurements, which are based, by way of example, on the measurement of the reception power level of the broadcast channel BCH, in the same way as would otherwise be done via the actual signal/interference ratio measurements in the case of an active data channel.

In the example of the circuit sketched in FIG. 3, signals from the broadcast channel BCH are investigated in the detector device, in the event of an interruption in the data signal, in a corresponding way instead of signals from the data channel.

It is also possible for the calculation of the power control commands in the UE to take account of the fact that there is a delay representing a number of time slots between the time slot for the broadcast channel BCH and the time slot for the data channel. This delay can result in an estimate which is based on the broadcast channel time slot having a low confidence factor for the data time slot. Longer-term time averaging of the measurement values on the broadcast channel BCH therefore may be carried out, depending on the delay. As such, if there is a long delay, the current measurement value is given a low weighting in comparison to this mean value while, if the delay is short, the current measurement value is given a stronger weighting. Since the uplink and downlink in a TDD system are reciprocal, the nature of the weighting also can be transferred from the weighting as is used, for example, for the open power control loop in the uplink direction.

An example of the profile of the reception power level of the broadcast channel BCH can be described as follows. If no more data is being received, the inner and the outer power control loops are maintained using measurements on the broadcast channel BCH. These measurements are interpreted relative to the quality Qo (for example, the bit error rate), the reception power level ELBC of the broadcast channel BCH and the disturbance power level Io immediately before the interruption in the data transmission. If the signal/interference ratio SIR of the most recently received signal section of the data differs from the signal/interference ratio nominal value SIR-target, then this is taken into account via an appropriate correction, with the most recent "correct" power control command preferably being taken into account in the method and algorithm described in the following text. The inner loop now measures the difference between the reception power level of the broadcast channel BCH and the most recently measured power level Po. This and the further measured disturbance power level which would occur if data were still present are used to calculate a virtual signal/interference ratio value SIRvirt, which is compared with the most recently calculated signal/interference ratio nominal value SIR-Target for data. Depending on the power control stepwidth, any change in the difference leads to power control commands "TPC Commands" which are transmitted to the transmitter or to the base station NB.

In the example of a circuit as illustrated in FIG. 3, signals from the broadcast channel BCCHBCH are investigated in the detector device in the event of an interruption in the data signal, in a corresponding manner, instead of signals from the data channel.

The following text is based on a control system example with an assumed stepwidth of 1 dB. Initially, the reception power level rises continuously by 10 dB at a rate of 1 dB/frame, then by 20 dB at 2 dB/frame, before then remaining constant at Po=+30 dB. The disturbance power level over the first 15 frames is constant, and then rises by 2 dB per frame to Io=−10 dB. 20 commands to reduce the transmission power level by 1 dB are sent successively from the mobile station UE, followed by commands to leave the transmission power level constant.

If the command for a constant transmission power level in the communications system or in one of the stations involved should not be implemented, a higher and a lower transmission power level can be signaled alternatively. The sum S or Δ0 of the transmitted power control commands thus follows the difference between $SIR_{virt}$ relative to $SIR_{target}$.

In one preferred embodiment, the TPC commands received in the meantime are added up in the transmitter, and the sum is stored. After a transmission pause, the first signal section of the data is transmitted at the power level S*stepwidth+most recent transmission power level before the transmission pause. In some circumstances, the transmission power level also may be corrected, if the rate matching has changed since the last transmission. Furthermore, the transmission power level also has an externally adjustable correction term applied to it.

In one preferred embodiment, the TPC commands received in the meantime are advantageously added up in the correction term as well, and the sum is stored. After a transmission pause, the first signal section of the data is transmitted at the power level S*stepwidth+most recent transmission power level before the transmission pause. In some circumstances, the transmission power level also may be corrected, if the rate matching has changed since the last transmission. Furthermore, the transmission power level also has an externally adjustable correction term applied to it.

The correction term also advantageously takes account of any change in the rate matching and/or channel coding. If, by way of example, less data is transmitted in a frame, then this data can be better protected, resulting in better quality after the decoding process, for the same SIR.

Errors can occur in the transmission of the TPC commands from the mobile station UE to the base station NB, so that the base station NB may not be able to read or decode the commands. This results in uncertainties in the sum calculation $\Sigma TPC(k)$. However, it can be assumed that, statistically, both "higher" and "lower" commands are lost, so that the effects are cancelled out. Furthermore, the receiver can take account of a certainty supplement or safety deduction in the transmission power level, depending on the number of commands which cannot be decoded.

If the transmission is interrupted in the uplink direction, this results in a situation in which, although the mobile station UE can carry out all the measurements, it cannot, however, transmit the power control commands that are produced to the network (node B). In this situation, one embodiment provides for the mobile station UE to add up all the generated power control commands TPC. The running sum may be transmitted either periodically or on the basis of a specific stimulus; for example, a threshold being exceeded, via, for example, channels at a higher level to the base station NB. Alternatively or additionally, it is possible to provide for the sum to be transmitted to the base station NB after the resumption of data transmission. Alternatively, instead of the sum, the difference between $SIR_{target}$ and SIR or SIRvirt at the transmission time also may be transmitted.

In addition to the inner control loop described above, the outer control loop also can continue to run. The outer control loop detects differences which cannot be regulated out by the signal/interference ratio SIR. By way of example, with the same signal/interference ratio SIR, the quality of a signal may differ if the transmission channel or, for example, the velocity of the mobile station UE changes. In situations such as this, the outer control loop has to follow the nominal value $SIR_{target}$ of the inner control loop. In order to ensure this mechanism takes place even with measurements on the broadcast channel BCH, the quality of the BCH must take account of the difference between the current signal/interference ratio on the broadcast channel (SIRbc(i)) and its initial value (SIRbc(0)).

The outer control loop takes the initial quality value of the broadcast channel BCH at the start of the transmission pause as a nominal variable, and compares the current quality value of the broadcast channel BCH with this, in order in this way to derive a nominal value SIR-target for the signal/interference ratio SIR for the inner control loop. This process should also take account of the fact that the signal/interference ratio SIR of the broadcast channel BCH may have changed, and its quality then also may have changed. This effect on the quality of the signal of the broadcast channel BCH should be compensated for in an appropriate manner. If the signal/interference ratio SIR on the broadcast channel BCH differs from the initial value by, for example, 3 dB in the upward direction, then the quality Q before the comparison with the initial quality value Qo is corrected using the value dQ, which is obtained from a signal/interference ratio SIR which is 3 dB too high. This compensation process decouples the influence of the signal/interference ratio SIR from the influence of the channel. As such, if, after the correction by dQ, there is still a difference between the initial quality value Qo and the correct broadcast channel quality value QBC+dQ, this difference is due purely to changes in the transmission channel.

The association of a correction value dQ with a difference in the signal/interference ratio SIR may be read from a table or matrix. The entries in the matrix may be derived automatically from previous empirical values, or may be predetermined in a fixed manner.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmission power control in a radio communications system having at least one mobile station and one base station which communicate with each other, the method comprising the steps of:
    determining, via the at least one mobile station, a reception power level of a signal which is sent from the at least one base station in a data channel during active communication;
    transmitting, via the transmitting one of the mobile stations, a power control instruction, wherein the power control instruction is derived from the determined reception power level;
    determining, via the at least one mobile station, a further reception power level signal that is sent from the at least one base station in a general signaling channel that is independent of the data channel, wherein the further reception power level is determined during an interruption in the active data communication in order to derive further transmission power control instruction, said further transmission power control instruction being derived from the further reception power level;
    sending, from the at least one mobile station, a plurality of further power control instructions to the at least one base station during the interruption in the active data communication;
    adding up, at the at least one base station, the received further power control instructions received from the at least one mobile station to form a sum as a power control instruction; and
    resuming the transmission, after the interruption in the active data transmission, via the base station, of signals in the data channel at a power level that is a sum of the transmission power before the interruption and the sum of power control instructions during the interruption.

2. A method for transmission power control in a radio communications system as claimed in claim 1, wherein the method supports one of a TDD method and an FDD method.

3. A method for transmission power control in a radio communications system as claimed in claim 1, wherein the mobile station transmits the power control instruction in an uplink connection to the base station.

4. A method for transmission power control in a radio communications system as claimed in claim 1, wherein the sum is used as power control instructions for power control.

5. A method for transmission power control in a radio communications system as claimed in claim 1, wherein the sum is transmitted at intervals.

6. A method for transmission power control in a radio communications system as claimed in claim 1, wherein the sum is transmitted before resumption of a communications connection to the transmitting one of the mobile station or base station.

7. A method for transmission power control in a radio communications system as claimed in claim 1, wherein the power control instruction is corrected via a correction value.

8. A method for transmission power control in a radio communications system as claimed in claim 7, wherein the correction value represents one of a safety supplement and a safety deduction based on an estimated detection certainty of received power control instructions.

9. A method for transmission power control in a radio communications system as claimed in claim 7, wherein the correction value takes account of at least one of changed rate matching and channel coding.

10. A method for transmission power control in a radio communications system as claimed in claim 1, wherein a weighting between a current path loss and a long-term path loss is taken into account when producing the power control instructions.

11. A method for transmission power control in a radio communications system as claimed in claim 1, wherein the power control instructions are processed in an inner control loop in the transmitting one of the stations.

12. A system for transmission power control in a radio communications system, comprising:
    at least one mobile station; and
    at least one base station which communicates with said at least one mobile station through a data channel and a general signaling channel,
    wherein the at least one mobile station determines a reception power level of a signal which is sent from the at least one base station in a data channel during active communication and transmits, via the at least one mobile station, a power control instruction, wherein the power control instruction is derived from the determined reception power level;
    and wherein the at least one mobile station determines a further reception power level a signal that is sent from the at least one base station in a general signaling channel that is independent of the data channel, wherein the further reception power level is determined during an interruption in the active data communication in order to derive further transmission power control instruction, said further transmission power control instruction being derived from the further reception power level;
    and wherein the at least one mobile station sends a plurality of further power control instructions to the at least one base station during the interruption in the active data communication;
    and wherein the at least one base station adds up the received further power control instructions received from the at least one mobile station to form a sum as a power control instruction; and
    wherein transmission is resumed after the interruption in the active data transmission via the base station, of signals in the data channel at a power level that is a sum of the transmission power before the interruption and the sum of power control instructions during the interruption.

* * * * *